United States Patent
Jackson et al.

(10) Patent No.: US 8,935,393 B1
(45) Date of Patent: Jan. 13, 2015

(54) RECOMMENDATIONS BASED ON USAGE AND RESOURCE CONSUMPTION DATA

(75) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 13/593,081

(22) Filed: Aug. 23, 2012

(51) Int. Cl.
*G06F 15/173* (2006.01)

(52) U.S. Cl.
USPC .............. 709/224; 709/225; 709/226

(58) Field of Classification Search
USPC .......... 709/224, 201, 203, 217–219, 225–226
See application file for complete search history.

(56) References Cited

U.S. PATENT DOCUMENTS

| | | | | |
|---|---|---|---|---|
| 8,112,366 | B2 * | 2/2012 | Hollingsworth et al. | 706/11 |
| 8,219,071 | B2 * | 7/2012 | Kokubo et al. | 455/414.4 |
| 8,468,164 | B1 * | 6/2013 | Paleja et al. | 707/767 |
| 8,595,626 | B2 * | 11/2013 | Brolley et al. | 715/738 |
| 2012/0131161 | A1 * | 5/2012 | Ferris et al. | 709/223 |
| 2012/0179973 | A1 | 7/2012 | Brolley et al. | |

OTHER PUBLICATIONS

"Which App? A Recommender System of Applications in Markets by Monitoring Users' Interaction," Enrique Costa-Montenegro, Ana Belen Barragans-Martinez, Marta Rey-Lopez, Fernando A. Mikic-Fonte and Ana Peleteiro-Ramallo, 2011 IEEE INternation Conference on Consumer Electronics (ICCE), pp. 353-354.
"AppJoy: Personalized Mobile Application Discovery", Bo Yan and Guanling Chen, MobiSys '11, Jun. 28-Jul. 1, 2011.
Facebook page, Facebook is Launching Targeted Mobile Ads Based on App Usage Data (i.e. Personal User Data), posted Jul. 9, 2012, Author: Godwin.

\* cited by examiner

*Primary Examiner* — Ruolei Zong
(74) *Attorney, Agent, or Firm* — Morris & Kamlay LLP

(57) ABSTRACT

An electronic device may generate use related information and resource consumption related information corresponding to each of used applications used in the electronic device. The use related information and the resource consumption related information may then be transmitted to a remote applications manager, which may analyze the information to generate, based on the analysis, specially tailored application recommendations. The application recommendations may list one or more other applications, newly available or offered, which may be recommended for download to and/or use in the electronic device. The analysis of the use and the resource consumption information may comprise ranking the used applications, such as based on use patterns and/or resource consumption, and/or classification of the used applications, such as based on application type. Generating the application recommendations may comprise correlating used applications, based on classification and/or ranking, with similar applications that may be recommended.

18 Claims, 5 Drawing Sheets

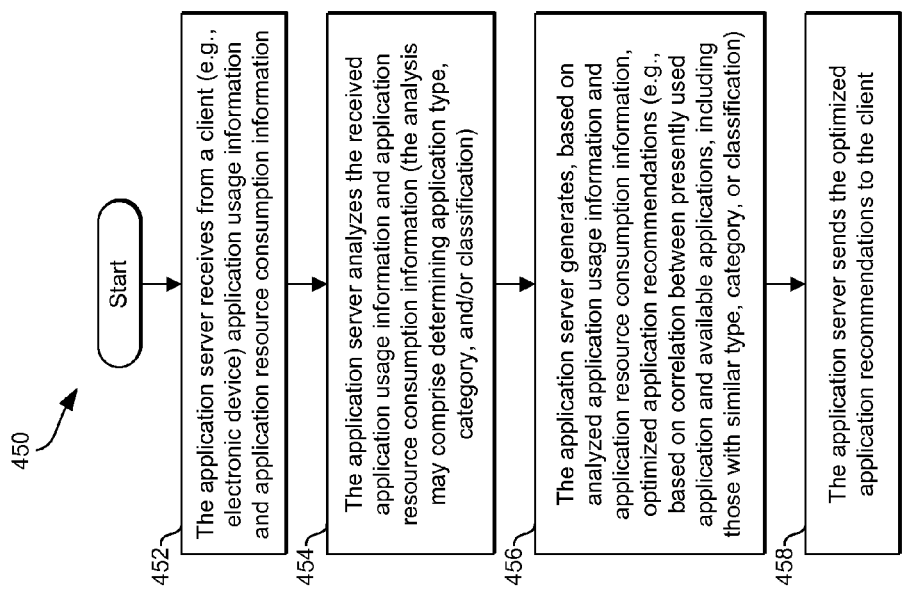

RECOMMENDATIONS BASED ON USAGE AND RESOURCE CONSUMPTION DATA

TECHNICAL FIELD

Aspects of the present application relate to electronic devices. More specifically, certain implementations of the present disclosure relate to improved marketing recommendations based on usage and resource consumption data.

BACKGROUND

Various types of electronic devices are commonly used nowadays. In this regard, electronic devices may be used by one or more users, for various purposes, both business and personal. Electronic devices may be mobile or non-mobile; may support communication (wired and/or wireless); and/or may be general or special purpose devices. Examples of electronic devices may comprise handheld mobile devices (e.g., cellular phones, smartphones, and/or tablets), computers (e.g., laptops, desktops, and/or servers), and/or other similar devices. In some instances, electronic devices may comprise applications that may be run in the electronic devices. In this regard, some applications may simply be intended for recreational use (e.g., games), while other applications may be intended for personal or business use (e.g., shopping, purchases, banking, scheduling, navigation, etc.). In some instances, electronic devices may come with pre-installed applications. In other instances, applications may be downloaded (e.g., via the web) and installed in the electronic devices.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for improved marketing recommendations based on usage and resource consumption data, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

BRIEF DESCRIPTION OF SEVERAL VIEWS OF THE DRAWINGS

FIG. 4B is a flow chart that illustrates server-side processing in support of improved marketing recommendations based on usage and resource consumption data.

DETAILED DESCRIPTION

Figure 1:
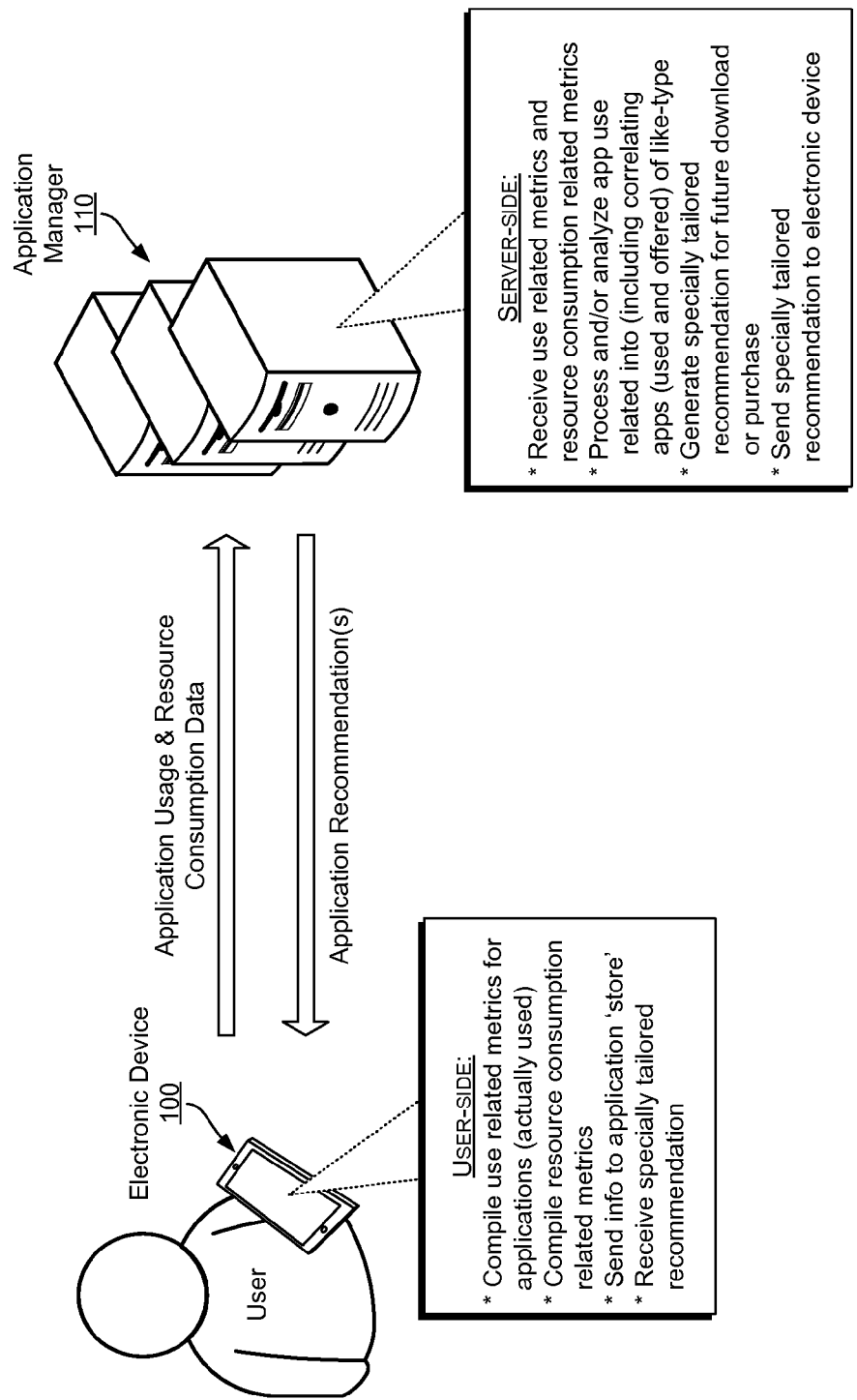
FIG. 1 is a block diagram illustrating interactions between a client electronic device and an application manager for improved marketing recommendations based on usage and resource consumption data.

The present disclosure relates to a method and system for improved marketing recommendations based on usage and resource consumption data. In various implementations, an electronic device may obtain and/or store data relating to applications that are used in the electronic device, and may accordingly generate actual use related information associated with each of the used applications, and application cost and/or resource consumption related information associated with each of the used applications. The electronic device may communicate the application actual use related information and the application cost and/or resource consumption related information to an applications manager. The electronic device may subsequently receive from the applications manager recommendation information pertaining to one or more other applications available for download to and/or use by the electronic device. In this regard, the recommendation information may be specifically configured and/or optimized based on the application actual use related information and the application cost and/or resource consumption related information. The disclosure is not so limited, however. In this regard, in some instances the recommendation information may be communicated to a third entity which may be used in making the information accessible by the end-user(s) by other means (e.g., app reviews webpage). The application actual use related information may comprise information relating to a number of uses, a duration of each use, and/or a degree and/or frequency of user interaction during each use. The application cost and/or resource consumption related information may comprise information relating to cost of obtaining and/or using applications, consumption of processing resources, storage resources, power resources, bandwidth, and/or available data allowance. In some instances, generation of information related to actual use of application available in the electronic device may be controlled based on user input. The electronic device may communicate an application related user preference to the applications manager.

After receiving the application actual use related information and the application cost and/or resource consumption related information from the electronic device, the applications manager may analyze the application actual use related information and the application cost and/or resource consumption related information, and may generate based on that analysis, recommendation information pertaining to one or more other applications available for download to and/or use by the electronic device. The applications manager may then communicate to the electronic device, and hence to the end-user(s), the recommendation information where is generated in such optimized and/or specifically manner. In some instances, the recommendation information may not be communicated back to the electronic device, but rather may be communicated to a third entity which may be used in making the information accessible by the end-user(s). For example, the recommendation information may be communicated to a web server which may avail the recommendation information via a webpage. In this regard, to ensure privacy and/or confidentiality, such webpage(s) may incorporate access control mechanisms (e.g., password or the like) to ensure that only intended user(s) gain access to the specifically generated recommendation information. During analysis of the application actual use related information and the application cost and/or resource consumption related information, the applications manager may rank used applications based on use patterns, cost and/or resource consumption requirements. The applications manager may classify, during the analysis of the application actual use related information and the application cost and/or resource consumption related information, the used and/or offered applications. The applications manager may correlate the used applications, based on classification and/or ranking of the one or more used applications, with similar applications from those being offered and/or may be newly available. The application recommendation information may be generated and/or modified based on the correlation between the classified and/or ranked used applications and the similar offered applications.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any single element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations. As utilized herein, the term 'server' may refer to a plurality of machines, at least some of which may be installed in different locations, and each of which may be utilized to implement distinct and/or redundant functions associated with operations attributed to and/or performed by the server.

FIG. 1 is a block diagram illustrating interactions between a client electronic device and an application manager for improved marketing recommendations based on usage and resource consumption data. Referring to FIG. 1 there is shown an electronic device 100 and an application manager 110.

The electronic device 100 may comprise suitable circuitry, interfaces, logic, and/or code that may be operable to perform various functions or operations, and/or run various applications and/or programs. In this regard, operations, functions, applications and/or programs supported by the electronic device 100 may be performed, executed and/or run based on user instructions or interactions, and/or based on pre-configured instructions. The electronic device 100 may comprise dedicated components or subsystems for enabling interactions with users, such as to obtain user input and/or to provide user output. In some instances, the electronic device 100 may enable communication of data or messages, such as via wired and/or wireless connections configured in accordance with one or more supported wireless and/or wired protocols or standards. Examples of electronic devices may comprise handheld mobile devices (e.g., cellular phones, smartphones, and/or tablets), computers (e.g., laptops or desktops), and/or other similar devices. The disclosure, however, is not limited to any particular type of electronic devices.

The application manager 110 may comprise suitable circuitry, interfaces, logic, and/or code for centrally managing applications that may be available to electronic devices, such as the electronic device 100. In this regard, the application manager 110 may be associated with an entity offering applications for download (free or by-purchase) to the electronic device 100. Such entities may comprise physical entities and/or logical entities. Examples of entities offering applications for download may comprise online application stores, content or service providers, and the like. The disclosure, however, is not limited to any particular type of application offering entity. The application manager 110 may comprise a dedicated processing system or general purpose system that is configured for use as centralized application manager (e.g., a dedicated server or a PC programmed to provide the application management functions described in this disclosure). In some instances, an application manager 'server' may actually comprise a plurality of machines, at least some of which may be installed in different locations, and each of which may be utilized to implement distinct or redundant functions associated with application management operations as described in the present disclosure.

In operation, the electronic device 100 may be used to run or executed and/or various applications, such as based on user instructions or interactions, and/or based on pre-configured instructions. In this regard, various types of applications may be available in the electronic device 100. For example, applications may differ in intended use. Some applications may simply be intended for recreational use (e.g., games), for example, white other applications may be intended for personal use (e.g., shopping, purchases, and banking), or may be intended for business use (e.g., scheduling, and remote access). The Applications may also differ in the required amount of user interactivity. For example, some applications may require constant and/or continuous user interaction (e.g., games, chats, or calling applications), while other applications may only require infrequent user interaction (e.g., email applications). Some of the applications available in electronic device 100 may be pre-installed on the device. In some instances, however, applications may be obtained and/or installed (e.g., by the user of the device) in the electronic device 100. For example, in some instances, applications may be downloaded (e.g., via Internet connection, over wired or wireless link) and installed in the electronic device 100. In this regard, applications may be offered for download (for free or by-purchase) by centralized application distribution systems or platforms (e.g., the application manager 110), which may comprise online application stores, content or service providers, or similar entities. In some instances, such centralized application distribution systems or platforms may offer applications by means or application advertisements or recommendations that may be directed to particular devices or users thereof. The advertised or recommended applications may be, for example, new applications previously not available, or existing (currently available) applications that may not be installed at the present time in the target end-point device(s). In some instances, generating the application advertisements or recommendations may be based on some information pertaining to the target end-point devices or users. For example, centralized application distribution systems or platforms may rely on application download history (i.e., lists of previously downloaded applications), associated with particular target user or end-point device, in configuring or modifying targeted application advertisements or recommendations. Such approach, however, may not yield optimal results because many applications that are downloaded application(s) may not be used at all, may be used only once and never again (e.g., the device user not liking the application(s)), may only be used sporadically; or, at the least, downloaded application(s) may be subjected to variable use patterns (e.g., some application(s) being used more than other(s)).

Accordingly, in various implementations of the disclosure, generation of the application advertisements or recommendations may be optimized, such as based on more detailed and precise information pertaining to existing (and/or previously downloaded application(s)), which may be provided by the target end-point devices (e.g., the electronic device 100), to enable the centralized application offering entity (e.g., application manager 110), to ensure that only an application likely to be selected and/or used would be included in the optimized application advertisements and/or recommendations.

For example, in an implementation of the disclosure, on the user-side, information relating to applications available in the electronic device 100 may be obtained and/or generated. In this regard, to optimize and/or enhance quality of application related information generated or obtained in the electronic device 100, information may be obtained or generated only with respect to applications that are being used, and/or during use of the applications. In this regard, for such actually used applications, the electronic device 100 may collect and/or generate actual use metrics. The actual use metrics may comprise information describing how many times an application was opened, triggered, or accessed, how long the application was actually used each time the application was opened or accessed, and total use information. The actual use metrics may also comprise information describing amount and/or degree of user interactivity when the application is opened or accessed. Such user interactivity data may be relevant because a subsequent recommendation determination may be skewed when applications are opened by the user but not used. The disclosure is not limited, however, to the use metrics described herein, and other types of use related information may be used. In this regard, in some instances the types of actual use metrics that may be generated and/or collected may be configured and/or modified, such as based on user input for example.

The electronic device 100 may also collect and/or generate, for each (actually) used application, cost and resource consumption related metrics. In this regard, the cost and resource consumption metrics may comprise data pertaining to cost and/or resource consumption associated with actual use of used applications. The resource consumption may relate to such resources as, for example, power, processing, storage, bandwidth (e.g., required or actual bandwidth during any communication associated with use of the application), and/or amount of data communicated (external to the electronic device 100). For example, the electronic device 100 may determine and/or collect, with respect to each used application, such cost and/or resource consumption related information as, for example: battery use, battery use after low-battery level indication, time before recharge after dead battery caused by the used application, usage of network (especially while on a much slower network), amount of memory required and/or utilized during actually use of the application, amount of actual processing (e.g., as percentage of total available processing capability in the electronic device 100), financial cost of buying an application, and/or financial cost of application actual use transactions. The electronic device 100 may then communicate the collected actual use metrics and the cost and resource consumption metrics to the application manager 110. In return, the electronic device 100 may receive an optimized application advertisement or recommendation from the application manager 100, which may be tailored specifically based on actual use.

On the server-side, the application manager 110 may receive from the client (e.g., electronic device 100) actual use metrics and the cost and resource consumption metrics. The application manager 110 may process and/or analyze the received information, to enable identifying and/or selecting applications that may be recommended and/or advertise which would likely be more suitable for and/or desired by user(s) of the electronic device 100. For example, the application manager 110 may correlate based on the actual use metrics and the cost and resource consumption metrics, and/or analysis thereof, used application(s) with the best candidates of available applications. In this regard, the application manager may select, for example, applications that may be deemed closest or most similar to used applications that were used frequently and/or extensively; and/or applications whose cost or resource consumption requirements may be deemed suitable based on reported cost metrics (e.g., applications whose cost or resource consumption do not exceed the cost or resources consumption of frequently used applications).

During analysis and/or processing of the received actual use metrics and the cost and resource consumption metrics, the application manager 110 may classify and/or categorize the applications (presently used and/or newly available ones), to further enhance, for example, the application correlation. In this regard, different types of applications may have different 'typical' use patterns, something that may be relevant when considering and/or analyzing use metrics. For example, while typical use of some applications may be interactive by nature (e.g., gaming applications), typical use of other applications may be intermittent (e.g., search or shopping applications). Also, some applications may be persistently active and are always running, regardless of user interactions (e.g., navigation applications). Thus, in order to best match used applications with newly available applications, like-type applications may be correlated when considering recommendations (e.g., thus an application developer who makes its applications persistent may not automatically get a better rating than an interactive or intermittent application).

Similarly, applications (presently used and/or newly available) may be classified and/or categorized based on their resource consumption (required and/or actually utilized) and/or cost (purchase and/or use related costs), with the classification and/or categorization being used in correlating similar applications (i.e., applications having similar resource consumption and/or cost profile). Once the best candidates among newly available applications are identified, the application manager 110 may generate application recommendation(s) or advertisement(s) that would be optimized for the particular client (device and/or its user(s)), and the application recommendation(s) or advertisement(s) may be communicated to the client (directly, to the device being used in obtaining the metrics, or indirectly, such as via reviews website). In some instances, cost/resource based analysis may be further enhanced by configuring candidate application selection function such that to depend on particular cost/resource related criteria or threshold. Rather than, for example, simply matching candidate application(s) with used application(s) simply based on cost or resource metrics values regardless of what these values may be, the cost/resource cost based matching may be applied and/or incorporate into the candidate application selection (for recommendation) only where particular cost/resource parameters meet particular criteria. For example, in instances where a used application may incur only small or limited battery use (e.g., less than 10%), battery (or power) conception metrics may not be incorporated into or relied upon during the candidate application selection. On the hand, in instances where the used application may incur substantial battery use (e.g., greater than 50%), battery (or power) conception metrics would be incorporated into and relied upon during the candidate application selection. In other words, only cost and/or resource metrics that may indicate significant or substantial cost and/or resource consumption may be relevant to candidate application selection since such metrics may be indicative that users who may be willing to tolerate high cost and/or resource consumption of an application would likely tolerate high cost and/or resource consumption of other applications. Also, tolerating high cost and/or resource consumption may also be relevant since it may indicate that applications which have an unusually high cost and/or resource consumption but are still being used are more likely to be perceived as quality applications by the user, and thus similar or compatible applications would be similarly perceived as quality applications.

In an example implementation, the application recommendation(s) or advertisement(s) generated by the application manager 110 may not be communicated to the electronic device 100. Rather, the application recommendation(s) or advertisement(s) may be communicated to another entity or device (not shown), which may be used in making that information accessible by the end-user(s). For example, the application recommendation(s) or advertisement(s) information generated by the application manager 110 may be communicated to a web server or similar system (not shown) which may avail the recommendation information to the user(s) via a website or a webpage. In this regard, the website or webpage may simply be associated with the user's account, or it may be generic website or webpage where all related applications may be listed irrespective of the applications a particular user owns. To ensure privacy and/or confidentiality, since information related to used or downloaded application may unwantedly divulge personal information about the user(s), such website or webpage may incorporate some access control mechanisms (e.g., password, passphrase, or the like) to ensure that only intended user(s) gain access to the specifically generated recommendation information.

In an example implementation, participation in an optimized application recommendation scheme may be selective or optional. For example, the application recommendation scheme may be implemented as an opt-in scheme, where device users may have to expressly choose (e.g., via input in the electronic device 100) to participate in the exchanges described between the electronic device 100 and the application manager 110, and/or to enable the electronic device 100 to obtain, collect, and/or generate application related information (e.g., actual use metrics and/or resource consumption metrics), and/or communicate that information to the application manager 110. Alternatively, the application recommendation scheme may be implemented as an opt-out scheme, where the electronic device 100 may be configured, as a default, to participate in the exchanges described between the electronic device 100 and the application manager 110, and the user must expressly disable or cease participation in the exchange with the application manager 110.

In an example implementation, the electronic device 100 may obtain, and send to the application manager 110 user preference related information pertaining to applications. For example, the user preference information may specify different weights that apply to parameters included in the actual use metrics and the cost and resource consumption metrics when analyzing the information.

In an example implementation, to maintain user privacy and confidentiality, anonymity may be incorporated into the exchanges between the electronic device 100 and the application manager 110. For example, the electronic device 100 may configure actual use metrics and the cost and resource consumption metrics such that it may not identify the user or contain personal information relating thereto. Temporary identifiers may be assigned, for example, to the electronic device 100 and/or its user(s), with these identifiers being used in the exchanges between the electronic device 100 and the application manager 110.

Figure 2:
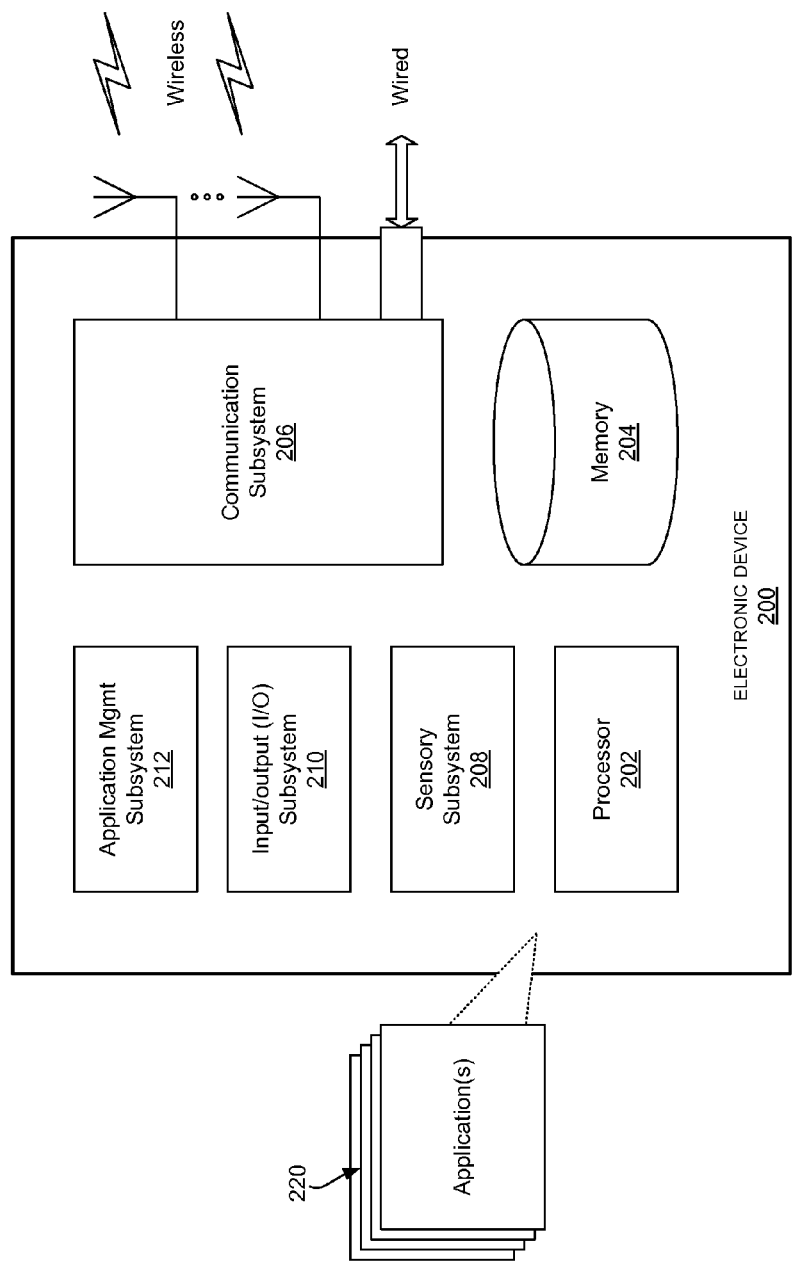
FIG. 2 is a block diagram illustrating an electronic device that may support improved marketing recommendations based on usage and resource consumption data.

FIG. 2 is a block diagram illustrating an electronic device that may support improved marketing recommendations based on usage and resource consumption data. Referring to FIG. 2 there is shown an electronic device 200.

The electronic device 200 may comprise suitable circuitry, interfaces, logic, and/or code that may be operable to implement various aspects of the disclosure. In this regard, the electronic device 200 may correspond to the electronic device 100 of FIG. 1, for example. The electronic device 200 may comprise, for example, a main processor 202, a system memory 204, a communication subsystem 206, a sensory subsystem 208, an input/output (I/O) subsystem 210, and an application management subsystem 212.

The main processor 202 may comprise suitable circuitry, interfaces, logic, and/or code that may be operable to process data, and/or control and/or manage operations of the electronic device 200, and/or tasks and/or applications performed therein. In this regard, the main processor 202 may configure and/or control operations of various components and/or subsystems of the electronic device 200, by utilizing, for example, one or more control signals. The main processor 202 may enable running and/or execution of applications, programs and/or code, which may be stored, for example, in the system memory 204. Alternatively, one or more dedicated application processors may be utilized for running and/or executing applications (or programs) in the electronic device 200.

The system memory 204 may comprise suitable circuitry, interfaces, logic, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication subsystem 206 may comprise suitable circuitry, interfaces, logic, and/or code operable to communicate data from and/or to the electronic device, such as via one or more wired and/or wireless connections. The communication subsystem 206 may be configured to support one or more wired protocols (e.g. Ethernet standards) and/or wireless protocols or interfaces (e.g., Bluetooth, WiFi, cellular, WiMAX, and/or any available wireless protocol/interface), facilitating transmission and/or reception of signals to and/or from the electronic device 200, and/or processing of transmitted or received signals in accordance with applicable wired or wireless protocols. In this regard, signal processing operations may comprise, for example, filtering, amplification, analog-to-digital conversion and/or digital-to-analog conversion, up-conversion/down-conversion of baseband signals, encoding/decoding, encryption/decryption, and/or modulation/demodulation.

The sensory subsystem 208 may comprise suitable circuitry, interfaces, logic, and/or code for obtaining and/or generating sensory information, which may relate to the electronic device 200, its user(s), and/or its environment. For example, the sensory subsystem 208 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 210 may comprise suitable circuitry, interfaces, logic, and/or code for enabling and/or managing user interactions with the electronic device 200, such as obtaining input from, and/or to providing output to, the device user(s). The I/O subsystem 210 may support various types of inputs and/or outputs, including, for example, video, audio, and/or textual. In this regard, dedicated I/O devices and/or components, external to or integrated within the electronic device 200, may be utilized for inputting and/or outputting data during operations of the I/O subsystem 210. Examples of such dedicated I/O devices may comprise displays, mice, keyboards, touch screens (or touchpads), and the like.

The application management subsystem 212 may comprise suitable circuitry, interfaces, logic, and/or code for managing applications and/or application related information in the electronic device 200. In this regard, the application management subsystem 212 may be configured to obtain and/or collect data relating to actual use of applications available in or supported by the electronic device 200, and/or to generate information relating to the applications or use thereof.

In operation, the electronic device 200 may be utilized (e.g., by the device user) to perform, execute and/or run various applications (220). The electronic device 200 may be configured to participate in and/or support optimized application recommendation scheme, as described with respect to FIG. 1 for example. In this regard, the electronic device 200 may obtain and/or collect, via the application management subsystem 212, information relating to applications available (or particularly used) in the electronic device 200. In this regard, data collection may be performed only with respect to applications being used, and/or only during actual use of the applications. Thus, based on actual use of applications in the electronic device 200, the application management subsystem 212 may collect and/or generate actual use related information, and/or cost and resource consumption related information. In this regard, the actual use related information may comprise collected information detailing, for each used application, a number of times the application was opened or accessed, a duration of actual use each time the application was opened or accessed, and aggregate use information, for example. The actual use related information may also comprise information describing an amount and/or degree of user interactivity when the application is opened or accessed. The cost and resource consumption related information may comprise, for example, data pertaining to cost and/or resource consumption associated with actual use of used applications. The resource consumption may comprise, for example, information relating to power use, processing utilization (percentage of total available processing), storage, power (e.g., battery), bandwidth usage (e.g., total and/or percentage of available bandwidth), and/or amount of data communicated during use of used application(s), which may comprise total amount of data (e.g., in bytes) communicated, and/or percentage of data allowance used up during such use (e.g., percentage of user's monthly data allowance from carrier used up during use of applications). The cost related information may comprise financial cost of buying an application and/or financial cost of application actual use transactions.

The electronic device 200 may communicate, via the communication subsystem 206, collected actual use related information and the cost and resource consumption related information to a centralized application management platform or system (e.g., the application manager 110). In return, the electronic device 200 may receive, via the communication subsystem 206, optimized application advertisement or recommendations.

In some instances, user input obtained via the I/O subsystem 210, may be used to configure and/or modify various functions of the application management subsystem 212. For example, user input may be used in enabling/disabling (e.g., to opt-in or opt-out) the application use related information collection functions, and/or to adjust or configure the information collection and/or generation functions (e.g., specifying what use, cost, or resource consumption related parameter to collect, and/or to assign various weight to the various parameters).

Figure 3:
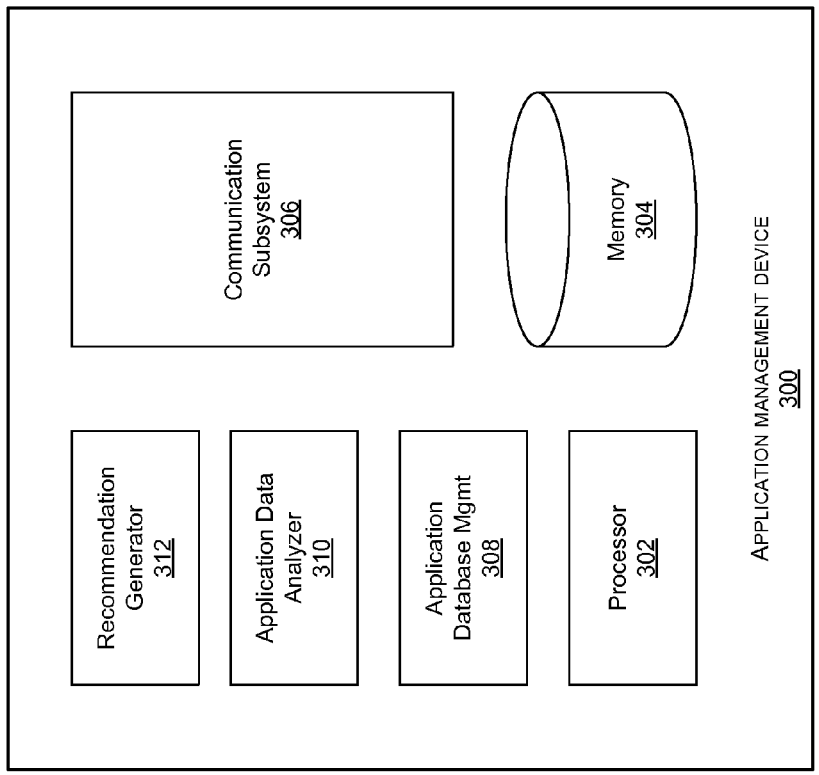
FIG. 3 is a block diagram illustrating an application management server for supporting improved marketing recommendations based on usage and resource consumption data.

FIG. 3 is a block diagram illustrating an application management server for supporting improved marketing recommendations based on usage and resource consumption data. Referring to FIG. 3, there is shown an application management device 300.

The application management device 300 may comprise suitable circuitry, interfaces, logic, and/or code that may be operable to implement various aspects of the disclosure. In this regard, the application management device 300 may correspond to the application manager 110 of FIG. 1, for example. The application management device 300 may comprise, for example, a main processor 302, a system memory 304, a communication subsystem 306, an application database management module 308, an application data analyzer 310, and a recommendation generator 312.

The main processor 302 may comprise suitable circuitry, interfaces, logic, and/or code that may be operable to process data; and/or control and/or manage components, operations or functions of the application management device 300, and/or tasks performed therein. In this regard, the main processor 302 may configure and/or control operations of various components and/or subsystems of the application management device 300, by utilizing, for example, one or more control signals.

The system memory 304 may comprise suitable circuitry, interfaces, logic, and/or code that may enable permanent and/or non-permanent storage, buffering, and/or fetching of data, code and/or other information, which may be used, consumed, and/or processed. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The communication subsystem 306 may be substantially similar to the communication subsystem 206 of FIG. 2 for example. In this regard, the communication subsystem 306 may comprise suitable circuitry, interfaces, logic, and/or code for enabling communicate data or messages from and/or to the application management device 300, via wired and/or wireless connections for example.

The application database management module 308 may comprise suitable circuitry, interfaces, logic, and/or code for managing, controlling, and/or utilizing an application database which may be maintained in the application management device 300. In this regard, the application database may comprise information corresponding to known and/or available applications. For example, the application database may comprise a plurality of entries, each corresponding to a particular application, with each entry comprising information pertinent to the associated application. The per-application information may comprise, for example, data for enabling classifying and/or categorizing the application (e.g., application type, amount of user interactivity, download or use costs, resource requirements, etc.).

The application data analyzer 310 may comprise suitable circuitry, interfaces, logic, and/or code for processing and/or analyzing application related information. In this regard, the application data analyzer 310 may be configured to process or analyze application related use metrics and application related cost and/or resource consumption metrics received by the application management device 300 from clients (e.g., electronic devices running or using applications).

The recommendation generator 312 may comprise suitable circuitry, interfaces, logic, and/or code for generating optimized and/or tailored application recommendation information in the application management device 300. In this regard, the recommendation generator 312 may be configured to generate application recommendations or advertisements directed to particular clients (e.g., electronic device 200) based on application related use metrics and application related cost and/or resource consumption metrics collected or generated by the clients, to enable correlating a previously/currently used application in the client with a newly available application being offered by the application management device 300.

In operation, the application management device 300 may generate optimized application recommendation(s) or advertisement(s), which may be specifically tailored for particular client device (e.g., the electronic device 200) or the device user(s). In this regard, the application management device 300 may generate the optimized application recommendations based on user and/or resource/cost related metrics received from the client device. For example, the application management device 300 may receive, via the communication subsystem 306, from the client device (electronic device 200) actual use metrics and/or cost and resource consumption metrics relating to particular application(s) whose use related metrics may be collected and/or generated by the client device, as described with respect to FIGS. 1 and 2 for example.

The application management device 300 may process and/or analyze, via the application data analyzer 310, the received information, to enable identifying and/or selecting newly available or offered applications that may be recommended and/or advertised, and which would likely be desired by user(s) of the client device. In this regard, the application data analyzer 310 may correlate, using the actual use metrics and the cost and resource consumption metrics, a used application with the best candidates of newly available or offered applications. In this regard, the application data analyzer 310 may search through a local application database, using application database management module 308, to find application(s) whose information best correlate with the received use metrics and cost and resource consumption metrics. Accordingly, the application data analyzer 310 may select applications that are deemed closest or most similar to used applications.

During analysis and/or processing of the received actual use metrics and the cost and resource consumption metrics the application management device 300 (e.g., via the application data analyzer 310) may classify and/or categorize the applications (presently used and/or newly available ones), to further enhance, for example, the application correlation. In this regard, applications may be classified or categorized based on type (e.g., gaming applications, searching applications, navigation applications, etc.), typical use characteristics (e.g., direct interactive use, direct intermittent use, and/or persistent user-independent use), resource consumption profiles (processing, memory, power, data bandwidth and allocation), and/or cost (purchase and/or use related costs).

Once the best candidate applications among newly available or offered applications are identified, the application management device 300 may generate, via the recommendation generator 312, application recommendation(s) or advertisement(s) that would be optimized for the particular client (device and/or its user(s)), and the application recommendation(s) or advertisement(s) may be communicated, via the communication subsystem 306, to the client device.

Figure 4A:
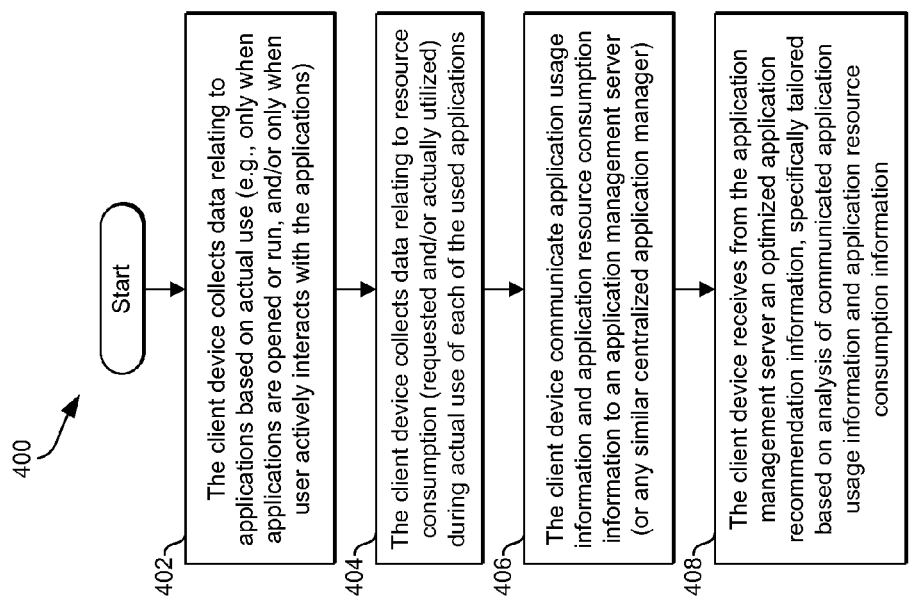
FIG. 4A is a flow chart that illustrates client-side processing in support of improved marketing recommendations based on usage and resource consumption data.

FIG. 4A is a flow chart that illustrates client-side processing in support of improved marketing recommendations based on usage and resource consumption data. Referring to FIG. 4A, there is shown a flow chart 400 comprising a plurality of example steps performed in an application client (e.g., electronic device 200), to support improved marketing recommendations based on usage and resource consumption data.

In step 402, a client device (e.g., an electronic device, such as device 200) may obtain and/or collect data relating to applications available in the client device, such as based on actual use. In this regard, collecting data relating to actual use may comprise collecting or obtaining data relating to the applications only when applications are opened or run, and/or when users actively interact with the applications. The client device may then generate actual usage information for each used application. In step 404, the client device may obtain or collect resource consumption associated with each of the used applications, and may generate accordingly for each used application resource consumption information. In this regard, resource consumption information may specify, for each corresponding application, requested and/or actually utilized resources, including aggregate and/or periodic resource consumption. Example of resources whose information (e.g., consumption) may be collected with respect to each used application may comprise, for example, processing, storage, bandwidth use, and/or amount of data communicated external to the client device (to and/or from the client device). In step 406, the client device may communicate application usage information and application resource consumption information to a centralized application management entity (e.g., application management device 300). In step 408, the client device may receive from the centralized application management entity optimized application recommendation information, specifically tailored for the client device based on analysis of previously communicated application usage information and application resource consumption information.

FIG. 4B is a flow chart that illustrates server-side processing in support of improved marketing recommendations based on usage and resource consumption data. Referring to FIG. 4B, there is shown a flow chart 400 comprising a plurality of example steps performed in an application server (e.g., application management device 300), to support improved marketing recommendations based on usage and resource consumption data.

In step 452, an application server (e.g., server 300) may receive from a client (e.g., an electronic device, such as the electronic device 200) application usage information and application resource consumption information. In step 454, the application server may analyze (e.g., via the application data analyzer 310) the received application usage information and application resource consumption information. In this regard, the analysis of application related information may comprise determining application type, category, and/or classification. In step 456, the application server may generate (e.g., via the recommendation generator 312), based on analyzed application usage information and application resource consumption information, optimized application recommendation(s). In this regard, generation of the recommendation may be based on a correlation between used application(s) whose information was received from the client(s) and available application(s). For example, the applications included in the generated recommendation may have a similar type, category, and/or classification. In step 458, the Application server may communicate the optimized application recommendation(s) to the client(s).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for improved marketing recommendations based on usage and resource consumption data.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
generating, in an electronic device, usage related information associated with each of one or more applications used in the electronic device, wherein the usage related information comprises information relating to at least one of the group consisting of a number of uses of the each of the one or more applications, a duration of each use of the each of the one or more applications, a degree of user interaction with the electronic device during each use of the each of the one or more applications, and a frequency of user interaction with the electronic device during each use of the each of the one or more applications;
generating resource consumption related information associated with the each of the one or more used applications, wherein the resource consumption related information comprises information relating to at least one of the group consisting of a consumption of processing resources, a consumption of storage resources, a consumption of power resources, a consumption of bandwidth, and a consumption of an available data allowance;
communicating the usage related information and the resource consumption related information to an applications manager; and
receiving, from the applications manager, recommendation information pertaining to an application available for at least one of the group consisting of download to and use by the electronic device, wherein the recommendation information is based on a comparison of the resource consumption related information to a certain threshold value related to a resource.

2. The method of claim 1, comprising:
controlling generation of at least one of the group consisting of the usage related information and the resource consumption related information, based on a user input to the electronic device.

3. The method of claim 1, comprising:
communicating an application related user preference to the applications manager, wherein the application related user preference at least one of the group consisting of controls and adjusts a function of the applications manager when generating recommendation information pertaining to the application available for at least one of the group consisting of download to and use by the electronic device.

4. A method, comprising:
receiving, by a server used for managing applications, from an electronic device, application usage related information and resource consumption related information associated with one or more applications used in the electronic device;
analyzing the application usage related information and the resource consumption related information, wherein the analyzing the application usage related information and the resource consumption related information includes comparing the resource consumption related information to a certain threshold value related to a resource; and
generating, based on the comparing the resource consumption related information to the certain threshold value related to a resource, recommendation information pertaining to an application available for at least one of the group consisting of download to and use by the electronic device.

5. The method of claim 4, comprising:
communicating the recommendation information to at least one of the group consisting of the electronic device and another device configured to display or output the recommendation information.

6. The method of claim 3, comprising:
ranking the one or more used applications based on at least one of the group consisting of use patterns and resource consumption costs.

7. The method of claim 3, comprising:
classifying the one or more used applications based on a type of application.

8. The method of claim 3, comprising:
correlating the one or more used applications with similar ones of one or more other applications, for at least one of the group consisting of download to and use by the electronic device, based on at least one of the group consisting of a classification and a ranking of the one or more used applications.

9. The method of claim 8, comprising:
generating or modifying the recommendation information based on the correlation between the at least one of the group consisting of classified and ranked one or more used applications and the similar ones of the one or more other applications.

10. A system, comprising:
an electronic device including one or more processors and a memory to store one or more instructions that when executed by the one or more processors, cause the one or more processors to:
  obtain or generate information relating to an application used in the electronic device;
  generate usage related information associated with the one or more used applications, wherein the usage related information comprises information relating to at least one of the group consisting of a number of uses of the application, a duration of each use the application, a degree of user interaction with the electronic device during each use of the application, and a frequency of user interaction with the electronic device during each use of the application;
  generate resource consumption related information associated with the application, wherein the resource consumption related information comprises information relating to at least one of the group consisting of a consumption of processing resources, a consumption of storage resources, a consumption of power resources, a consumption of bandwidth, and a consumption of an available data allowance;
  communicate the usage related information and the resource consumption related information to an applications manager; and
  receive recommendation information pertaining to an application available for at least one of the group consisting of download to and use by the electronic device, wherein the recommendation information is based on a comparison of the resource consumption related information to a certain threshold value related to a resource.

11. The system of claim 10, wherein the one or more processors further are to:
  control the generation of at least one of the group consisting of the usage related information and the resource consumption related information, based on a user input to the electronic device.

12. The system of claim 10, wherein the one or more processors further are to:
  communicate an application related user preference to the applications manager, wherein the application related user preference at least one of the group consisting of controls and adjusts a function of the applications manager when generating recommendation information pertaining to the application available for at least one of the group consisting of download to and use by in the electronic device.

13. A system, comprising:
a hardware-implemented server configured to manage applications provided to electronic devices for use therein, the server being operable to:
  receive, from an electronic device, application usage related information and resource consumption related information associated with an application used in the electronic device;
  analyze the application usage related information and the resource consumption related information by comparing the resource consumption related information to a certain threshold value related to a resource; and
  generate, based on the comparing the resource consumption related information to the certain threshold value, recommendation information pertaining to an application available for download to the electronic device.

14. The system of claim 13, wherein the hardware-implemented server is operable to:
  communicate the recommendation information to at least one of the group consisting of the electronic device and another device configured to display or output the recommendation information.

15. The system of claim 13, wherein the hardware-implemented server is operable to rank the used application based on at least one of the group consisting of use patterns and resource consumption costs.

16. The system of claim 13, wherein the hardware-implemented server is operable to classify the used application based on type of application.

17. The system of claim 13, wherein the hardware-implemented server is operable to correlate the used application with similar ones of one or more other applications, for at least one of the group consisting of download to and use by, the electronic device, based on at least one of the group consisting of a classification and a ranking of the one or more used applications.

18. The system of claim 13, wherein the hardware-implemented server is operable to generate or modify the recommendation information based on the correlation between the at least one of the group consisting of classified and ranked used application and the similar ones of the one or more other applications.

* * * * *